Feb. 19, 1957  P. A. STURTEVANT  2,781,881
TORQUE APPLIER
Filed April 25, 1951  6 Sheets-Sheet 1

INVENTOR.
Paul A. Sturtevant
BY
Sheridan, Davis and Cargill
Attorneys

Feb. 19, 1957 P. A. STURTEVANT 2,781,881
TORQUE APPLIER

Filed April 25, 1951 6 Sheets-Sheet 3

Fig. 3

INVENTOR.
Paul A. Sturtevant
BY Sheridan, Davis
and Cargill
Attorneys

Feb. 19, 1957 P. A. STURTEVANT 2,781,881
TORQUE APPLIER
Filed April 25, 1951 6 Sheets-Sheet 4

INVENTOR.
Paul A. Sturtevant
BY
Sheridan, Davis & Cargill
Attorneys

Feb. 19, 1957 P. A. STURTEVANT 2,781,881
TORQUE APPLIER
Filed April 25, 1951 6 Sheets-Sheet 5

INVENTOR.
Paul A. Sturtevant
BY
Sheridan, Davis & Cargill
Attorneys

Feb. 19, 1957 P. A. STURTEVANT 2,781,881
TORQUE APPLIER
Filed April 25, 1951 6 Sheets-Sheet 6

INVENTOR.
Paul A. Sturtevant
BY
Sheridan, Davis & Cargill
Attorneys

United States Patent Office 2,781,881
Patented Feb. 19, 1957

2,781,881

TORQUE APPLIER

Paul A. Sturtevant, Elmhurst, Ill.

Application April 25, 1951, Serial No. 222,903

40 Claims. (Cl. 192—56)

This invention relates to a torque applier and is an improvement of the torque applier disclosed in my United States Letters Patent No. 2,491,531 of December 20, 1949, the application for which was copending with my pending application for United States Letters Patent, Serial No. 133,845, filed December 19, 1949, for Torque Applier.

For so much of the subject matter disclosed herein which is also disclosed in my above-identified pending application, I claim the priority of that pending application.

An object of this invention is the provision of a novel and an improved torque applier adapted automatically to interrupt or stop the transmission of rotary force or torque at a predetermined value of the delivered torque or, stated somewhat differently, when a predetermined resistance to the rotary force being delivered is encountered by the torque applier.

Another object of the invention is the provision in such a torque applier of axially separable clutch elements which, instead of being declutched against a resisting force substantially equal to the predetermined value of the torque at which transmission thereof is automatically interrupted, is declutched against a relatively minute, almost negligible resisting force provided almost entirely by the inertia of a movable clutch member of relatively small mass or, in other words, by the resistance to movement of such a clutch member.

A further object of the invention is the provision of such a torque applier wherein an axially movable clutch member is releasably held against axial movement in drive transmitting position during operation of the novel torque applier and, when released, needs substantially only a force just sufficient to overcome the inertia of the clutch member or the resistance of its mass to axial movement for axial declutching movement of the movable clutch member.

It is another object of the invention to provide in the novel torque applier driving means which is torsionally yieldable to provide relative movement between spaced portions thereof in response to the torque being delivered thereby and to utilize that relative movement to actuate means for freeing a clutch element for declutching movement axially of the driving means.

A further object of the invention is the provision in the novel torque applier of rotatable torque transmission elements which are axially reciprocable between torque transmitting and non-transmitting positions and which are submerged in oil to cushion the impacts as those elements are so moved during operation of the torque applier.

Another object of the invention is the provision in such a torque applier of adjustable torque responsive means for releasing latch means releasably holding an axially movable clutch member in torque transmitting position whereby to free that clutch member for axial declutching movement at any of a plurality of predeterminable values of torque delivered by the torque applier.

Other objects of the invention will appear from the following description which considered with the accompanying drawing discloses a preferred embodiment of the invention.

In that drawing wherein the same reference characters respectively designate the same parts throughout the several views.

As disclosed in the accompanying drawings, the invention is shown as being embodied in a power operated tool adapted to supply rotary force or torque to, for example, nuts, screws, bolts, studs, or other work for setting or driving such work. It will be understood, however, that the disclosed embodiment of the invention is illustrative and not by way of limitation thereof, since the features of the invention obviously may be embodied in various tools for delivering torque where desired and for automatically interrupting or disrupting the delivery of such torque at a predetermined value or amount thereof.

Figure 1:
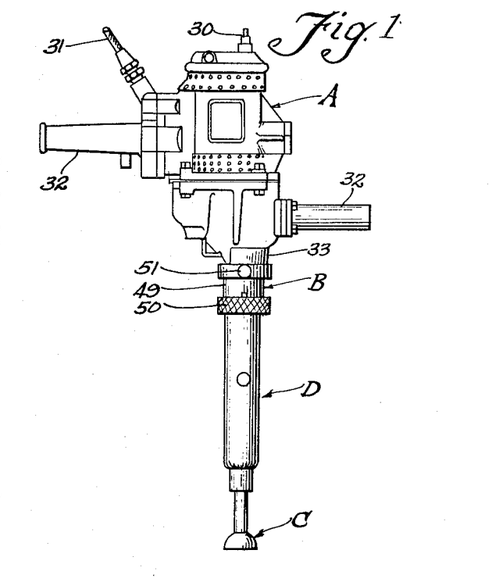
Figure 1 is a more or less diagrammatic view in side elevation of the novel torque applier shown removably coupled to a suitable source of power for driving it and removably carrying a usual work engaging means.

The illustrated tool comprises a suitable source of power, coupling means, work engaging means, and my novel torque applier all shown more or less diagrammatically in Fig. 1 and designated by the general reference characters A, B, C, and D, respectively. As therein shown, the torque applier D is detachably secured in drive-transmitting relationship to the power source A by the coupling means B, and removably carries the work engaging means C adapted to be driven by the torque applier for applying or delivering torque to the work.

Figure 4:
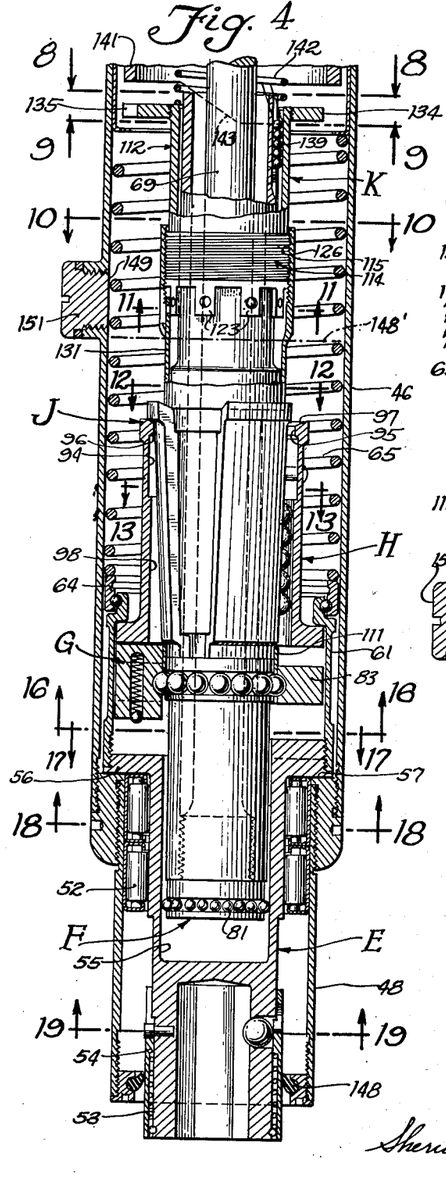
Fig. 4 is a fragmentary view in longitudinal cross-section through the casing of the novel torque applier showing the work head and clutch means in cross-section, and the driving means, the latch means, and the latch operating means partially in elevation and partially in cross-section in their relative positions just before the torque applier is applied to the work for delivering torque thereto.

Generally described, the novel torque applier embodying the features of the invention comprises, as shown in Fig. 4, a rotatably and axially reciprocably mounted work head or driven means E. The work head is adapted releasably to carry the work engaging means C for rotation and reciprocation therewith. That work head is rotatable by driving means F through clutch means G. The driving means F is rotatable by the power source A and includes at least one part which is resiliently and torsionally yieldable in proportion to the torque delivered by the torque applier or, in other words to the resistance offered by the work to rotation by the torque applier. The torsional distortion resulting from the yielding of the driving means produces relative rotation between axially spaced portions thereof.

The clutch means G includes a driving clutch member or element mounted on the driving means F for rotation therewith and reciprocation axially thereof, and declutching means normally urging that driving clutch member in a declutching direction axially of the driving means F during the delivery of torque by the torque applier to the work. That driving clutch member is carried on a drive head H reciprocably mounted on and rotatable with the driving means F and is releasably held against declutching movement by latch means J. When, during delivery of torque to the work by the novel torque applier, the driving clutch member is released by the latch means J, the declutching means instantly automatically moves the driving clutch member axially to its declutched position. To permit the automatic declutching of the clutch means G, the latch means J is adapted to be operable to release the driving clutch member by adjustable latch operating means K mounted on the end of the driving means F opposite the work head E.

As in the torque applier of my above identified patent, I utilize the torque responsive relative movement due to the torsional yielding between axially spaced portions of the driving means to operate the latch operating means for operating the latch means to release the driving clutch member for automatic movement to declutched position by the declutching means.

Since none of the power source A, coupling means B, nor work engaging means C per se constitutes any part of the invention, they will not be described in detail. It might be well, however, briefly to point out that the illustrated power source A comprises, as will be understood by those skilled in the art and shown in Fig. 1, a suitable electric motor (not shown) controlled by an on-and-off switch 30, usual means 31 for connecting the motor to an appropriate source of electrical energy (not shown), usual speed reduction gearing (not shown), and a suitable housing encasing the motor and gearing and provided with convenient handle means 32. The housing of the power source A is provided with a hollow cylindrical portion 33 open at its outer end to facilitate connecting the power source to a desired tool or implement.

Figure 5:
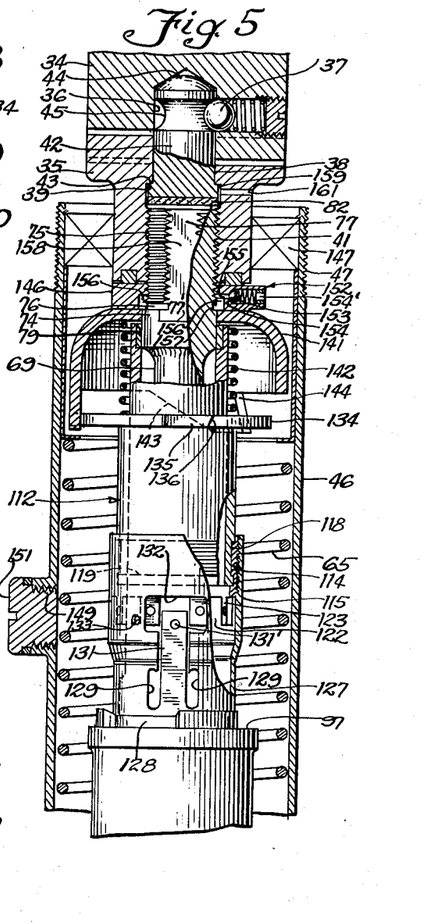
Fig. 5 is a fragmentary view of the upper portion of the torque applier shown at a smaller scale in Fig. 1 showing partially in cross-section and partially in elevation some of the details of the drive transmitting coupling between the torque applier and power source, the details of the means for releasably locking the adjustable latch operating means in any adjusted position.

The coupling means B comprises, as shown in Fig. 5, complementary clutch or drive coupling members 34 and 35, the former being suitably secured to for rotation with the output chuck or spindle of the power source A in the cylindrical portion 33 of its housing. That drive coupling member 34 has an axial recess 36 near the inner end of which a spring-urged, retaining ball 37 is arranged to facilitate releasably connecting the drive coupling members 34 and 35 in driving relationship.

Extending axially through the drive coupling member 35 is a passage 38 which inwardly of one end is enlarged throughout the remainder of its length to provide an internal shoulder 39, and the peripheral wall of which is threaded as at 41 inwardly from the opposite end of the passage. For releasably connecting those drive coupling members 34 and 35 in drive transmitting relationship, a pin 42 is inserted in the passage 38 from the threaded end thereof and moved axially therein until the pin extends outside and beyond the other end of the passage. The pin 42 has an external flange 43 at an end thereof for engagement against the internal shoulder 39 in the passage 38 to limit the axial movement of the pin in one direction. The diameter of that flange 43 is less than that of the threaded portion of the passage 38 to provide an annular chamber about the flange when the pin 42 is so arranged in the passage 38. The portion of the pin extending outside of the passage 38 is receivable in the recess 36 and is provided at its outer end with a cam surface 44 and a peripheral groove 45 inwardly adjacent that surface.

Thus with the pin 42 arranged in the coupling member 35, as just described, the two coupling members may be brought together in driving relation and the grooved end of the pin moved axially in the recess 36. The cam surface 44 during such movement of the pin engages the spring urged ball 37 causing its spring to yield to permit further axial movement of the pin inwardly of the recess 36 until the groove 45 in the pin is brought into registration with the ball 37. When that occurs, the spring urged ball moves into engagement in that groove releasably to hold the coupling members 34 and 35 in drive transmitting relationship.

The novel torque applier is housed, as shown in Figs. 2 to 7, in a suitable casing 46 of substantially cylindrical shape. At one end of the novel torque applier, hereinafter sometimes called the input or energy-receiving end, the casing is provided with an externally threaded portion 47 (Fig. 5). At the opposite end of the torque applier, hereinafter sometimes called the output or energy-delivery end, the casing has a portion 48 of smaller diameter than the input end.

As shown in Fig. 1, a collet type of coupling member 49, externally and internally threaded at one end, is threadedly attached to the threaded casing portion 47 and is secured thereon by a suitable coupling nut or ring 50. The coupling member 49 extends outwardly beyond the threaded casing portion 47 and is adapted to receive the cylindrical portion 33 of the housing for the power source A to which the coupling member 48 is releasably attachable by any suitable means such as a retaining screw 51.

Figure 3:
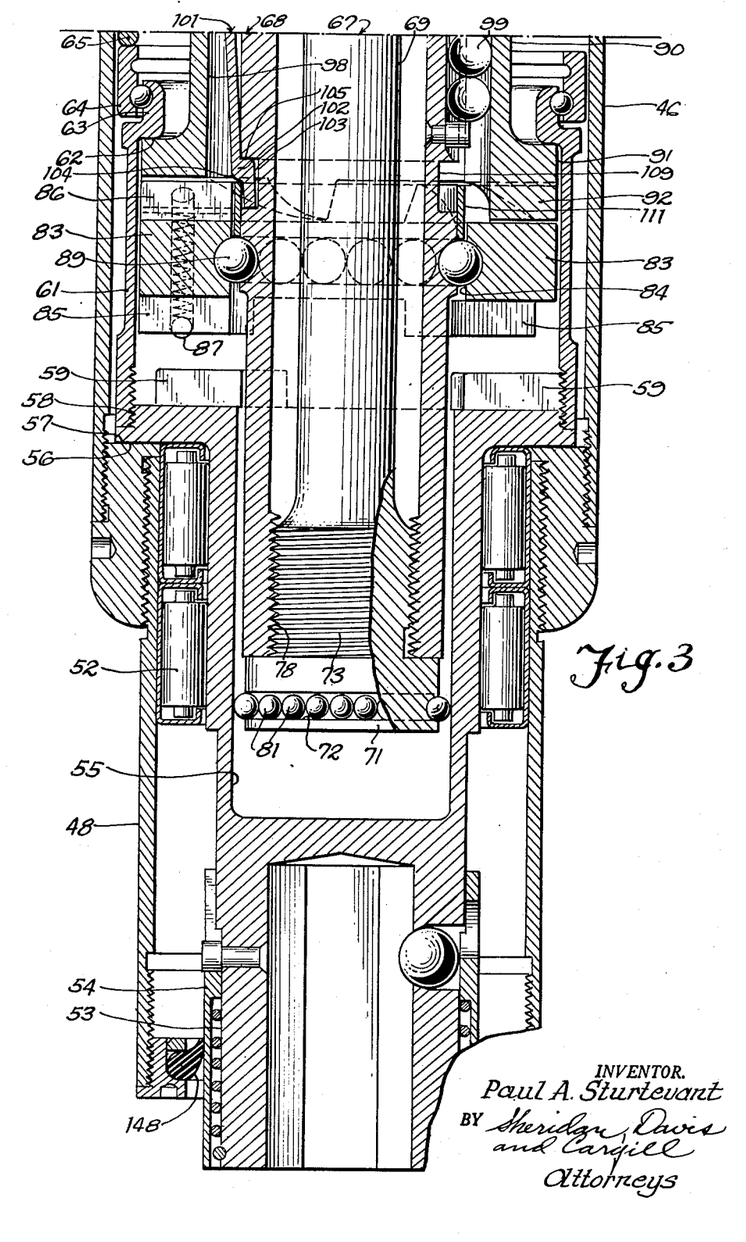
Fig. 3 is a fragmentary view in longitudinal cross-section of about the lower half of the torque applier shown at a smaller scale in Fig. 1, and is drawn at about the same scale as Fig. 2.

The work head E is, as shown in Figs. 3 and 16 to 19, substantially cylindrical in shape and is adapted to be journalled in suitable bearings 52 for rotation and axial reciprocation in the casing portion 48. At one end, the work head is, as best seen in Fig. 3, provided with a chuck portion 53 having suitable means 54 for releasably locking the work engaging means C in the chuck portion for rotation and axial reciprocation therewith. In its opposite end, the work head has an axial shaft recess 55 adapted to receive therein one end of the driving means F.

Intermediate its ends, the work head is provided with an external flange 56, the outer face of which is engageable with an internal shoulder 57 of the casing at the inner end of the casing portion 48 for limiting axial movement of the work head in a direction outwardly of the outer end of that casing portion 48. A driven clutch member of the clutch means G is preferably carried by or made a part of the work head. Accordingly, the flange 56 is provided, inwardly beyond its outer face, with an externally threaded wall portion 58 of reduced diameter. The inner end of that threaded wall portion is milled or otherwise formed with a plurality of, for example three, axially extending clutch teeth or elements 59 of the clutch means G. Those clutch teeth, as illustrated, are spaced apart about the longitudinal axis of the work head at about 120° center to center.

Threadedly attachable to the threaded wall portion 58, as shown in Fig. 3, is a tubular extension 61 of the work head, providing a clutch casing for the clutch means G. At its end opposite the threaded connection, the clutch casing or tubular extension is provided with an internal flange 62 and an extension 63 of reduced diameter. That extension 63 carries a spring abutment ring 64 rotatably mounted thereon. A coil spring 65 (Fig. 2) having a diameter slightly less than the internal diameter of the casing 46 is adapted to engage at one end against the abutment ring 64 and at its other end against a suitable abutment 66 in the casing 46 near the threaded portion 47 thereof. The spring is of such strength that, while it will hold the work head E in its outer position with the work head flange 56 engaging against the casing shoulder 57 and the chuck portion 53 extending outwardly beyond the outer end of the casing portion 48, it is readily yieldable by a relatively small axial force against the outer end of the chuck portion to permit inward axial movement of the work head E.

Figure 2:
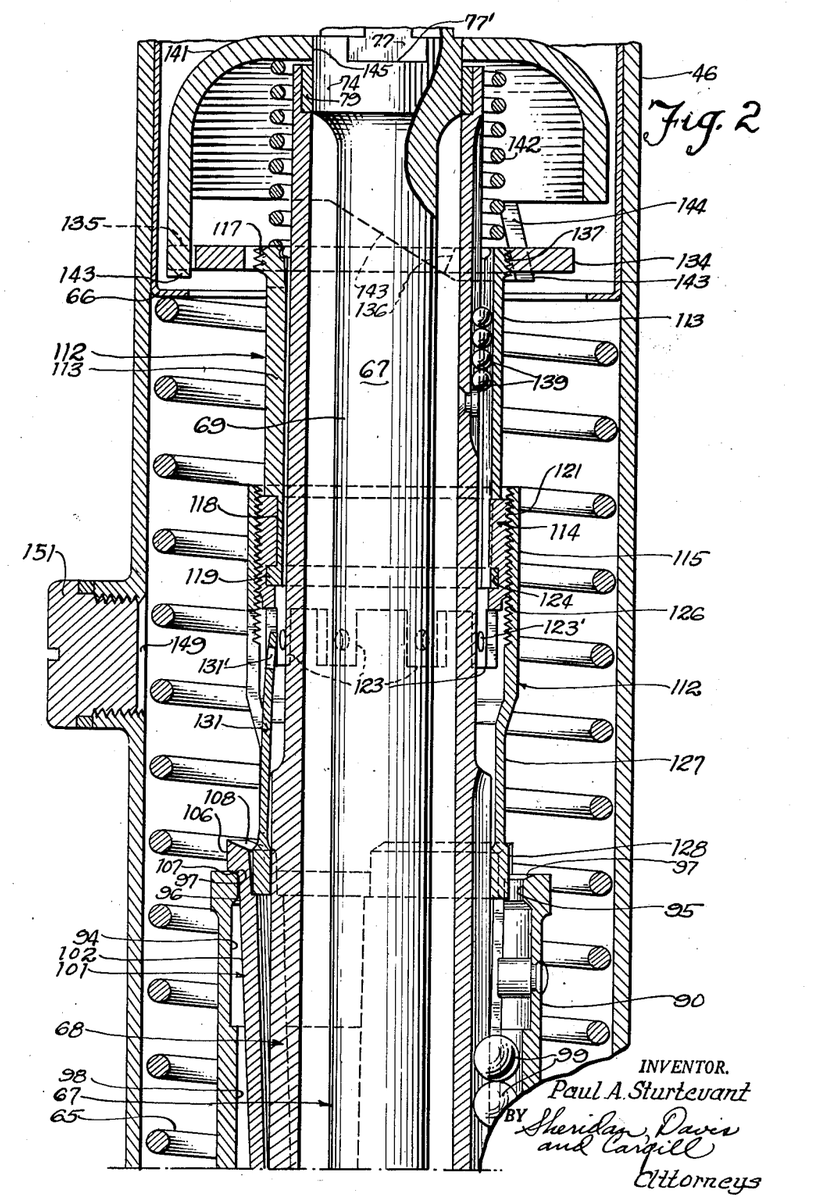
Fig. 2 is a fragmentary longitudinal cross-section of about the upper half of the torque applier shown at a smaller scale in Fig. 1.

The driving means F comprises, as shown in Figs. 2 and 3, a shaft-and-tube assembly including a shaft or spindle 67 and a tube 68, one of which, preferably the shaft, is torsionally resilient and yieldable. That shaft is provided with a relatively long portion 69 intermediate its ends, a flange portion 71 having a peripheral groove 72 at one end, a threaded portion 73 between the flange portion 71 and the adjacent end of the portion 69, a flange portion 74 adjacent the opposite end of the portion 69, and a threaded portion 75 at the opposite end of the shaft and spaced axially from the flange portion 74 by a peripheral groove 76. The resilient shaft has one or more flat portions 77, each providing a shoulder 77' at its inner end inwardly beyond the groove 76 and extending outwardly from that shoulder throughout the length of the threaded portion 75.

The tube 68 of the driving means has an internal diameter greater than the diameter of the shaft portion 69. At one end, the tube has an internally threaded portion 78. The threaded end portion 75 of the shaft 67 is inserted in the threaded end portion 78 of the tube 68 and the shaft or tube is moved axially to bring the threaded portions 73 and 78 thereof together. The tube is then fixed on to rotate with the threaded portion 73 of the shaft by screwing the threaded portions 73 and 78 together until the threaded end of the tube engages the flange portion 71 of the shaft.

From that connection between the shaft and one end of the tube, the tube extends along the shaft toward the threaded end portion 75 thereof almost to the shoulder 77' at the inner end of each flat portion 77. The opposite end of the tube is not secured directly to the shaft but, inwardly of each shoulder 77', embraces a bushing ring 79 about the flange portion 74 of the shaft 67. Hence the shaft and the the tube at that end of the tube are relatively rotatable. The flange portion 71 of the driving means F is receivable in the shaft recess 55 of the work head E. Suitable bearing balls 81 in the peripheral groove 72 of the flange portion 71 are engageable with the peripheral wall of the shaft recess 55 to permit axial reciprocation of the work head relative to the shaft and rotation of the shaft relative to the work head.

As will presently be more fully described, the driving means F, the clutch means G, the drive head H, the latch means J, the spring 65, the latch operating means K, and the work head E are assembled in operative relationship, and provide a tool assembly. When they are so assembled, the chuck portion 53 of the work head is inserted in the threaded casing portion 47, and the casing 46 or the tool assembly is moved axially to move the external flange 56 of the work head into engagement with the internal shoulder 57 of the casing 56. In that position, the chuck portion 53 extends outwardly beyond the outer end of the casing portion 48 (Fig. 4).

When the tool assembly is so arranged axially in the casing 46, the drive coupling member 35 (Fig. 5) with the grooved end of the pin 42 extending outside the passage 38 from the end thereof opposite the threaded end portion 41 of that passage is screwed on the threaded end portion 75 of the shaft. If desired, suitable spacing means 82 of the same diameter as the flange 43 of the pin 42 may be inserted in the passage 38 before the coupling member 35 is thus fixed on to rotate with the shaft 67 for holding the external flange 43 of the pin 42 against the internal shoulder 39 of the drive coupling member 35. The coupling means B may now be assembled, as already described, to attach the torque applier D and the power source A in driving relationship.

In addition to the clutch teeth 59, the clutch means G includes a clutch member or collar 83 (Fig. 3) having an axial bore 84 of a diameter slightly larger than the outer diameter of the tube 68 and having an outer diameter slightly less than the internal diameter of the clutch casing 61. The clutch member 83 is milled or otherwise formed to provide a plurality of clutch teeth or elements 85 and 86 extending axially in opposite directions at the ends of the clutch member. In the illustrated embodiment of the invention, there are three of each of the clutch teeth 85 and 86 and they are spaced about the longitudinal axis of the clutch member at about 120° center to center. The clutch teeth 85 are of about the same length axially of the clutch member 83 as the clutch teeth 59 of the work head E and are adapted to cooperate therewith to establish and disrupt driving engagement between the clutch member 83 and the work head E when the work head is moved axially inwardly and outwardly of the casing portion 48.

One of the clutch teeth 85 is provided with a spring urged ball 87 (Figs. 3, 4, and 16) a part of which extends through an aperture in an end face of the tooth. Each of the clutch teeth 86 has an engaging surface 88 diverging from its base at about 15° from the plane including the axis of the clutch member 83 and the base of that engaging surface to provide a cam-shaped engaging surface. The cam-shaped engaging surfaces 88 are at corresponding sides of the teeth 86.

The clutch member 83 is arranged on the tube 68 of the driving means F with the teeth 85 opposed to the teeth 59 of the work head E and is so spaced therefrom axially of the tube, when the work head is in its outer position, that the distance between the opposed end faces of the teeth 59 and 85 is about equal to the depth of a tooth 59 or a tooth 85. With the clutch member 83 so arranged, it is freely rotatably mounted on, and fixed against movement along the tube 68 by bearing balls 89 engaging in registerable circumferential grooves in the peripheral walls of the tube 68 and the bore 84. When the clutch member 83 is so mounted, it serves to limit the movement of the work head E axially inwardly of the casing against the action of the spring 65, from an outer position shown in Fig. 3 to an inner position shown in Fig. 6. Thus the work head is axially reciprocable between its outer position where the work head flange 56 engages the casing shoulder 57 and the teeth 59 and 85 are in disengaged or declutched relationship, and an inner position where the clutch teeth 59 and 85 are in clutched or driving engagement.

Figure 6:
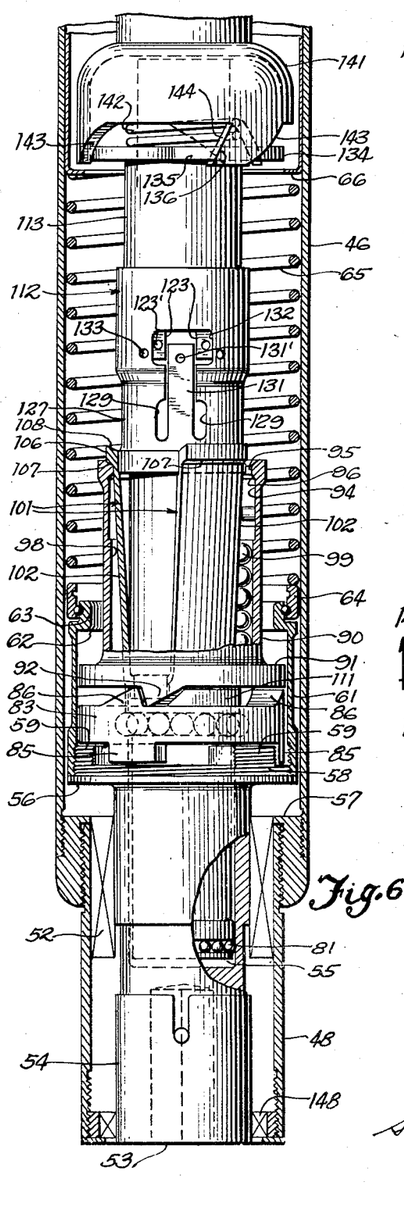
Fig. 6 is a view somewhat like Fig. 4 and shows the relative positions of the various parts while the torque applier is delivering torque.
Figure 7:
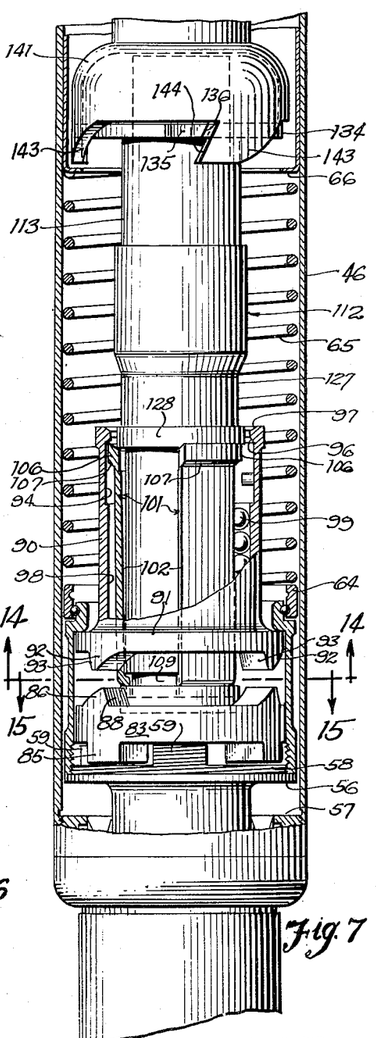
Fig. 7 is a view somewhat like Fig. 6 and shows the relative positions of the various parts after the driving means has been declutched from the work head but before the torque applier has been withdrawn from the work.
Figure 14:
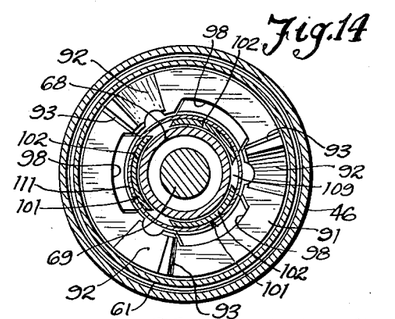
Fig. 14 is a view in transverse cross-section of the novel torque applier taken substantially along the lines 14—14 of Fig. 7 and shows a plan view of the clutch teeth of the drive head.

A driving clutch member of the clutch means G is preferably carried by or made a part of the drive head H. As illustrated in Figs. 2 to 4 and 14, the drive head is a substantially tubular structure with an internal diameter greater than the external diameter of the tube 68. The drive head has a tubular body portion 90 provided at one end with an external flange 91 of about the same external diameter as that of the clutch member 83. The outer end of that flange 91 is milled or otherwise formed to provide axially extending clutch teeth or elements 92 in number, shape, and spacing correspondinging to those of the teeth 86 of the clutch member 83 (Figs. 6, 7 and 14). The respective clutch teeth 92 have cam-shaped engaging surfaces 93 at corresponding sides thereof which are complementary to and engageable with the cam-shaped engaging surfaces 88 of the teeth 86 when the clutch means G is assembled in the casing.

Figure 13:
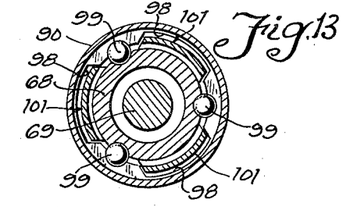
Fig. 13 is a view in transverse cross-section of the assembled driving means and drivehead, and is taken substantially along the lines 13—13 of Fig. 4.

Near the end of the drive head H opposite the clutch teeth 92, the tubular body portion 90, has, as shown in Figs. 2, 4, 6, and 7, an internal annular slot or groove 94 cut or otherwise formed in the peripheral wall of the bore thus providing an internal annular flange 95 at that end of the drive head. That flange has bevelled or cam-shaped surfaces 96 and 97 at its opposite ends, the cam-shaped surface 96 constituting an end of the annular slot 94. Extending longitudinally of the drive head from the end of the annular slot 94 opposite the flange 95 to the toothed end of the flange 91, three arcuate slots or grooves 98 (Fig. 13) are cut or otherwise formed in the peripheral wall of the bore of the drive head. Those slots 98 are spaced about that peripheral wall at about 120° center to center and are coaxial therewith.

The drive head H is adapted to be mounted on the driving means F for rotation therewith and reciprocation axially therealong by suitable bearing balls 99 arrangeable in complementary grooves in the peripheral walls of the tube 68 and the bore of the drive head, such grooves in the latter being spaced apart at about 120° center to center and in alternating relationship with the slots 98. Such mounting of the drive head is effected before the clutch casing 61 of the work head E is attached to the threaded wall portion 58 thereof.

Before the drive head H is so mounted on the driving means F, a plurality of identical latch members 101 are pivotally secured to the driving means. As illustrated in Figs. 2 to 4 and 13, there are three of those latch members which, with the annular flange 95 in the drive head, constitute parts of the latch means J. Each latch member 101 comprises a body portion 102 which is of arcuate cross-section. The radius of its concave surface is substantially equal to that of the outer peripheral surface of the tube 68.

Figure 12:
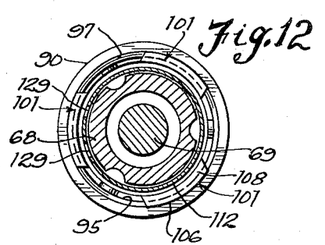
Fig. 12 is a view similar to Fig. 11, but taken substantially along the lines 12—12 of Fig. 4, and shows a plan view of the latch means.
Figure 15:
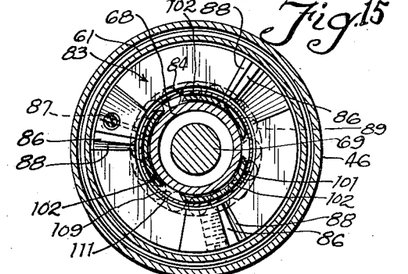
Fig. 15 is a sectional view similar to Fig. 14 but taken substantially along the lines 15—15 of Fig. 7 and shows a plan view of the clutch teeth which are on an intermediate clutch member and are complementary to those shown in Fig 14.
Figure 16:
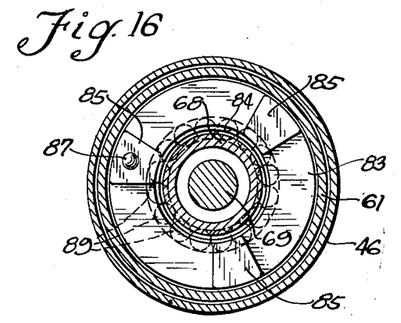
Fig. 16 is a sectional view similar to Fig. 15 but taken substantially along the lines 16—16 of Fig. 4 and shows a plan view of the clutch teeth at the end of the intermediate clutch member opposite that shown in Fig. 15.
Figure 17:
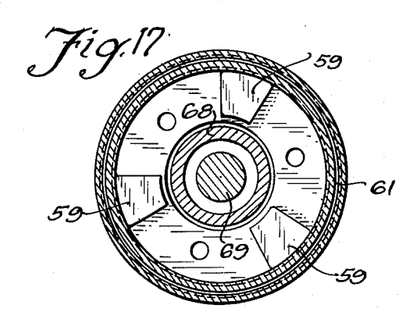
Fig. 17 is a sectional view similar to Fig. 16 and taken substantially along the lines 17—17 of Fig. 4 and shows a plan view of the clutch teeth complementary to those shown in Fig. 16.
Figure 18:
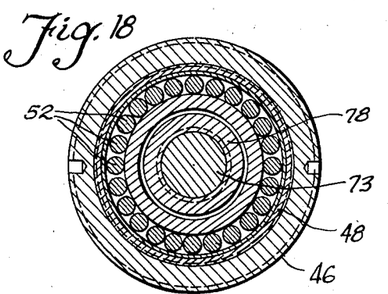
Fig. 18 is a view in transverse cross-section of the novel torque applier taken substantially along the lines 18—18 of Fig. 4.
Figure 19:
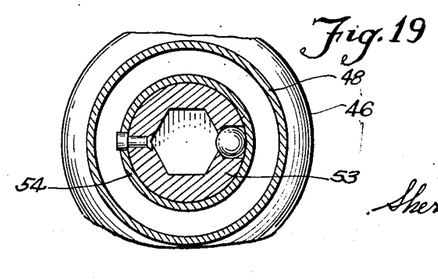
Fig. 19 is a fragmentary view in transverse cross-section of that torque applier taken substantially along the lines 19—19 of Fig. 4.

At one end, the body portion 102 of each latch member 101 has an arcuate extension 103 (Figs. 3, 4 and 15), the convex and concave surfaces of which have lesser radii than those of the body portion, respectively, thus providing an external shoulder 104 and an internal shoulder 105. At its opposite end, the body portion 102 of each latch member 101 has an arcuate flange 106 (Figs. 2, 4, and 12), the convex and concave surfaces of which have greater radii than those of the body portion, respectively, the other two opposite sides of that flange being bevelled to provide spaced cam-shaped surfaces 107 and 108.

The latch members 101 are symmetrically disposed about the periphery of the tube 68 with their arcuate extensions arranged in an annular groove or slot 109 in the peripheral wall of the tube 68 adjacent the clutch member 83 and with their body portions 102 extending from that slot along the tube 68 toward the input end of the driving means F. A suitable ring or sleeve 111 engages about the arcuate extensions 103 in the groove 109 to secure the latch members to the tube 68. The length of the groove 109 along the tube 68 is slightly greater than the length of the arcuate extensions 103 therein. By reason of that arrangement, the latch members are capable of limited pivotal movement whereby their flanged ends are swingable radially inwardly and outwardly of the tube 68 about the hinge-like connections provided by the extensions 103 held in the groove 109 by the ring 111.

With the latch members 101 so attached to the tube 68, the tubular drive head H is disposed about the latch members 101 in such a manner that the respective latch members register with different ones of the slots 98 in the drive head and the teeth 92 thereof are adjacent the teeth 86 on the clutch member 83. In that position, the drive head is, as already described, slidably attached to the driving means F for rotation therewith. When that is accomplished, the clutch casing 61 of the work head E is arranged about the clutch means G in such a manner that the internal flange 62 of that clutch casing is engageable with the end of the external flange 91 opposite the clutch member 92 of the drive head. With the tubular extension so arranged, it is threadedly connected to the wall portion 58 of the work head E.

From the foregoing description it will be seen that the external flange 91 and the clutch teeth 92 of the drive head H are disposed between the axially spaced clutch member 83 and the internal flange 62 of the clutch casing 61. When the work head E is in its inner position (Fig. 6) with its chuck portion 53 inside the casing portion 48, the axial spacing between the clutch member 83 and the internal flange 62 of the clutch casing 61 is such that the axially reciprocable drive head H is movable in one direction until its internal flange 91 engages, and the axial movement thereof is stopped by the internal flange 62 of the clutch casing 61, and in the opposite direction until the clutch teeth 92 engage and the axial movement thereof is stopped by the clutch member 83. The extent of axial movement of the drive head so limited by the clutch member 83 and the internal flange 62 of the clutch casing 61 is a distance about equal to or slightly greater than the depth of the clutch teeth 59 or 85 plus the depth of the clutch teeth 86 or 92.

Thus when the drive head H is in one of its extreme positions (Figs. 3 and 6), the clutch teeth 92 thereof drivingly engage the clutch teeth 86 of the clutch member 83. That is the normal position of the drive head just prior to the use of the tool for delivering torque. In that position of the drive head, the arcuate flanges 106 of the latch members 101 are beyond and outside the end of the drive head having the internal flange 95. When the clutch teeth 86 and 92 are in clutched engagement and torque is being delivered from the drive head to the work through the clutch means G, the cam-shaped engaging surfaces 88 and 93 of the clutch teeth urge the drive head axially toward its declutched position. When the drive head is in its other extreme position (Fig. 7), the clutch teeth 92 and 86 are disengaged and the opposed ends thereof are axially spaced apart a distance about equal to or slightly greater than the depth of the clutch teeth 59 or 85. In the latter position of the drive head, the arcuate flanges 106 of the latch members 101 are in registration with the annular slot 94 in the tubular body portion 90 of the drive head H.

Figure 9:
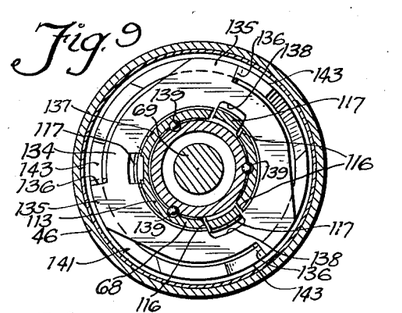
Fig. 9 is a view in transverse cross-section of that torque applier taken substantially along the lines 9—9 of Fig. 4.
Figure 10:
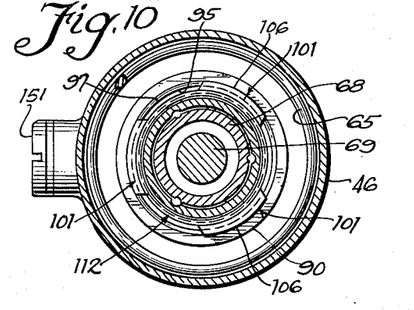
Fig. 10 is a view in transverse cross-section of my torque applier taken substantially along the lines 10—10 of Fig. 4.
Figure 11:
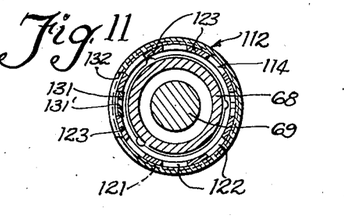
Fig. 11 is a view in transverse cross-section of the assembled driving means and adjustable latch operating means and is taken substantially along the lines 11—11 of Fig. 4.

The latch operating means K includes an adjustable tubular trigger 112, shown in Figs. 2 and 4 to 7. That trigger is an assembly of three tubular members 113, 114 and 115, adjustably secured together in coaxial relationship. The tubular member 113 is externally threaded at one end and has, as shown in Fig. 9, a plurality of spaced slots 116 cut in its wall extending from that end longitudinally toward the other end to provide one or more deformable tabs 117. Near its end opposite the threaded end, the tubular member 113 has an annular groove or slot 118 cut or otherwise formed in its peripheral wall to provide an external end flange 119.

Figure 20:
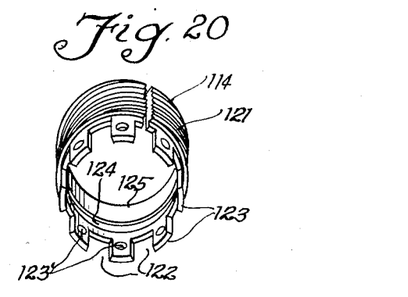
Fig. 20 is a perspective view of a tubular member employed in the latch operating means to permit adjustment thereof for varying the torque at which the clutch means interrupts or disrupts the transmission of torque to the work head.

The tubular member 114, as shown in Fig. 20, is in the form of a resilient split sleeve having at one end an externally threaded annular portion 121. The end of the tubular member or split sleeve 114 opposite the threaded body portion 121 is milled or otherwise formed with spaced slots 122 extending from that end of the tubular member to adjacent the threaded body portion 121 to provide an annular series of spaced projections or tabs 123, each having an aperture 123' therein. Near the base of the tabs 123 an annular groove or slot 124 is provided in the wall of the body portion 121 from the inner surface thereof, thus providing an internal end flange 125 adjacent the end of that slot 124 opposite the tabs 123.

The split tubular member or sleeve 114 is, as shown in Fig. 2, forced on to engage about the end flange 119 of the tubular member 113. One of those tubular members 113 or 114 is thereupon moved axially relative to the other until the end flange 125 of the tubular member 114 is in registration with the annular groove 118 of the tubular member 113, and the end flange 119 of the last-mentioned tubular member is in registration with the annular groove 124 of the tubular member 114. In that position the force of the resiliency of the split tube 114 causes the end flanges 125 and 119 to engage in the annular grooves 118 and 124, respectively, registering therewith. In that manner, the tubular members 113 and 114 are connected together in coaxial relationship against relative axial movement and are relatively rotatable, the tabs 123 of the tubular member 114 projecting outwardly beyond the end of the tubular member 113 opposite its threaded end.

The tubular member 115 has, as shown in Fig. 2, an internally threaded tubular portion 126. That internally threaded portion 126 is screwed on the externally threaded body portion 121 of the split tubular sleeve or member 114 and extends from that connection in a direction opposite the tubular member 113 beyond the outer ends of the tabs 123 where the tubular member 115 is provided with a tubular portion 127 of smaller diameter and integral with the portion 126.

The tubular portion 127 is of about the same diameter as the tubular member 114 and has at its end opposite the tubular portion 126 an external annular flange 128 which is a part of the latch means J. Spaced elongated apertures 129 through the peripheral wall and at one side of the tubular portion 127 extend, as shown in Figs. 5 and 6, from adjacent the flange 128 longitudinally of the member 115 to adjacent the end of the tubular portion opposite the flange 128. The tubular member 115 is slit along spaced lines extending from the inner ends of the adjacent longitudinal sides of the apertures 129 toward the internally threaded end of the member 115 beyond the adjacent integral ends of the tubular portions 126 and 127 of the tubular member 114, and there the tubular member is slit transversely to define a resilient tab 131. That tab 131 thus has a portion cut from the tubular portion 126 and a portion cut from the smaller tubular portion 127. When it is bent to bring the first-mentioned portion into the plane of the other portion, it becomes a resilient key extending into one of the slots 122 between and in the path of the tabs 123. Like the tabs 123, the resilient key or tab 131 is provided with an aperture 131' in the end thereof extending into one of the slots 122.

The tubular portion 126 is provided, as shown in Figs. 5 and 6, with an aperture 132 large enough to expose the aperture 131' in the key 131 and the aperture 123' in each tab 123 adjacent each of the opposite sides of the key 131. Adjacent each side of the aperture 132, an aperture 133 is provided through the wall of the tubular portion 126.

From the foregoing description of the adjustable tubular latch trigger 112 it will be understood that the trigger may be longitudinally lengthened or shortened by pressing the apertured end of the resilient key 131 radially inwardly out of the path of the tabs 123, and while holding the resilient key 131 in that position, rotating the tubular member 114 in the appropriate direction relative to the tubular member 115. When that is done, the externally threaded tubular body portion 121 of the tubular member 114 cooperates with the internally threaded tubular portion 126 of the tubular member 115 to lengthen or shorten the trigger 112, depending upon the direction of rotation of the tubular member 114. When the trigger 112 is so adjusted to the desired length, the apertured end of the resilient key 131 is released and it springs outwardly into one of the slots 122 of the tubular member 114 and between and in locking engagement with the two tabs 123 at opposite sides of that slot releasably to lock the tubular member in the adjusted position. The length of the trigger 112 determines the amount or degree of torque at which the driven means or work head E and driving means F are disconnected.

Adjustment in the field is made by a suitable tool engageable in the aperture 131' and the aperture 123' in one of the tabs 123 adjacent the resilient key 131, depending upon the desired direction of rotation of the tubular member 114. While so engaged, the tool is manipulated first to press the apertured end of the resilient key 131 radially inwardly to release the tubular member 114 for rotation and, thereafter, to rotate that tubular member until the tab 123 overlaps the apertured end of the resilient key 131 and holds it out of locking engagement with the tab. With the tool still or subsequently engaged in the aperture 123' of the overlapping tab 123, the tool is disengaged from the aperture 131' and engaged in the aperture 133 of the tubular portion 126 at the side of the resilient key 131 opposite the position of the overlapping tab 123 before its movement to overlapping relationship with the resilient key. The tool is now manipulated to resume the rotation of the tubular member 114 in the same direction relative to the tubular member 115 and to continue such rotation until the engaged tab 123 is moved out of overlapping relationship with the resilient key 131, and the slot 122 at the side of that tab 123 opposite that in which the resilient key was previously engaged is moved into registration with the resilient key 131. When the tubular member 114 is rotated to that position the apertured end of the resilient key springs radially outwardly into the registering slot 122 and releasably locks the tubular member 114 against further adjusting rotation relative to the tubular member 115. In like manner, the length of the trigger 112 may be increased or decreased from that adjusted position to any of a plurality of positions corresponding to predetermined degrees or amounts of torque at which the driving and driven means are to be disconnected.

Figure 8:
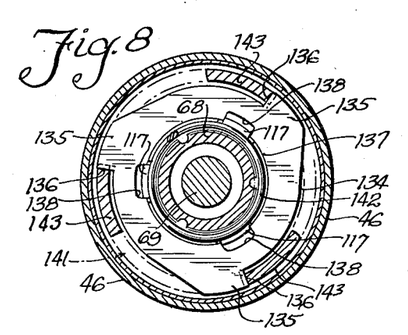
Fig. 8 is a view in transverse cross-section of the novel torque applier taken substantially along the lines 8—8 of Fig. 4.

The trigger 112 in the illustrated embodiment of the invention carries, as shown in Fig. 2, the disk cam 134 constituting a part of the latch operating means K. The disk cam 134 has a plurality of equally spaced, radially extending cam lobes 135. As illustrated in Figs. 8 and 9, there are three such lobes 135, each having a cam-shaped engaging surface 136. Each cam-shaped engaging surface 136 extends axially of the disk cam 134 at an angle of about 15° to a plane including the cam axis and either end of the surface at an end face of the cam. The cam 134 is provided with an axial aperture 137, its peripheral wall being threaded, and adapted to receive therein and threadedly to engage the externally threaded end of the tubular member 113. Communicating with that aperture and extending radially outwardly therefrom is an aperture 138 for each deformable tab 117 at the threaded end of the tubular member 113. Each aperture 138 is adapted to receive one of the tabs 117 when the cam is threaded on the tubular member. After the cam 134 is threaded on the threaded end of the tubular member 113 and each aperture 138 is brought into registration with one of the deformable tabs 117, each tab 117 is sprung or deformed radially outwardly to engage in the registering aperture 138 whereby to secure the cam on the end of the trigger 112 for rotation and axial reciprocation therewith. When the disk cam is so attached to the threaded end of the trigger 112, each cam-shaped engaging surface 136 extends from its end at the outer surface of the disk cam in diverging relationship to the axial plane of the trigger 112 including that end of the cam-engaging surface.

The assembled tubular trigger 112 carrying the cam 134 secured to its threaded end, as just described, is arranged on the driving means F about the tube 68 thereof, with the end flange 128 adjacent the arcuate flanges 106 of the latch members 101, and with the end carrying the cam 134 near the inner end of the threaded portion 75 of the shaft 67. In that position the tubular trigger 112 and the attached disk cam 134 are fixed for rotation with and axial reciprocation along the tube 68 of the driving means F by any suitable means, such as bearing balls 139 (Fig. 2) engaging in complementary grooves in the periphery of the tube 68 and the inner wall of the tubular member 113 at one end of the trigger 112. The spring 65 is now arranged about the tubular body portion 90 of the drive head H with one end engaging the abutment ring 64, and extends axially therefrom along the tubular trigger 112 and beyond the disk cam 134.

Thus the trigger 112 is movable axially along the driving means F in directions toward and away from the threaded portion 75 of the shaft 67. When the trigger is so moved away from that threaded shaft portion 75 toward the position shown in Fig. 2 while the drive head is in driving relationship with the clutch member 83, the outer end of the flange 128 engages the cam surfaces 108 of the latch members 101, camming those latch members radially outwardly about their hinge-like connections to the tube 68. Such outward radial movement of the latch members 101 is limited by the engagement of their body portions 102 adjacent the arcuate flanges 106 with the internal flange 95 at the end of the drive head H opposite the external flange 91 thereof. Continued movement of the trigger 112 in that direction disposes its end flange 128 between the periphery of the tube 68 and the swingable ends of the latch members 101 (Figs. 2 and 6), thus preventing the latch members from swinging radially inwardly toward the tube 68 and releasably latching the drive head H against axial movement in a direction to disengage the clutch teeth 92 thereof from the clutch teeth 86 of the clutch member 83.

When the trigger 112 is moved from that latching position of Figs. 2 and 6 toward the threaded end portion 75 of the shaft 67 sufficiently to move the outer end of the flange 128 axially beyond the adjacent sides of the cam surfaces 108 at the ends of the latch members 101, the drive head H is free to move axially to its declutched position (Fig. 7). Substantially only the inertia of the drive head or the resistance of its mass to movement resists such movement. Hence substantially only the relative small force needed barely to overcome that resistance is required to move the drive head H to its declutched position.

If such force is applied to the drive head H while the trigger 112 is in the position just described, the axial movement of the drive head H toward its declutched position causes the cam surface 97 of the drive head H and cam surfaces 107 of the latch members 101 to cam the swingable ends thereof radially inwardly toward the tube 68. In so moving inwardly toward the tube 68, the cam surfaces 108 of the latch members 101 engage the outer end of the end flange 128 of the trigger 112 and cam the trigger axially toward the threaded end portion 75 of the shaft 67.

Such axial movement of the trigger 112 is sufficient to permit enough movement of the latch members 101 radially inwardly to allow the internal end flange 95 of the drive head to move axially beyond the external flanges 106 of the latch members 101 where the flanges 106 register with the annular slot 94 adjacent the internal flange 95. In that position the latch members 101 may be swung radially outwardly to cause their flanges 106 to enter the slot 94 and engage the cam surface 96 of the drive head H whereby releasably to latch the drive head in its declutched position. Such swinging of the latch members radially outwardly to latch the drive head in its declutched position is effected by urging the outer end of the end flange 128 of the trigger 112 against the cam surfaces 108 of the latch members 101 whereby to cam the latch members radially outwardly from the tube 68 to move their external flanges 106 into the annular slot 94 of the drive head.

In addition to the adjustable trigger 112 and the disk cam 134, the latch operating means K comprises, as shown in Figs. 2, 5, and 6, a substantially cup-shaped cam 141 and a coil spring 142, which with the disk cam are adapted to reciprocate the trigger 112 axially of the driving means F for operating the latch means J releasably to latch the drive head H in its clutched and declutched positions relative to the cam member 83. The coil spring 142 is of slightly larger inside diameter than the outside diameter of the tube 68.

The peripheral wall of the cup-shaped cam has an outside radius slightly less than the radial distance from the axis of the disk cam 34 to the outer ends of the cam lobes 135. The inside radius of that wall is slightly greater than the radial distance from the center of the disk cam to the base of its cam lobes. That peripheral wall at the open end of the cup-shaped cam is milled or otherwise formed with a plurality of peripheral equally spaced cam lobes or lugs 143, equal in number to the number of cam lobes 135 of the disk cam. Each cam lobe 143 has, as illustrated in Figs. 6 and 7, a cam-shaped engaging surface 144. The cam-shaped engaging surfaces 144 are complementary to the cam-shaped engaging surfaces 136 of the disk cam 134. Each surface 144 makes an angle of about 15°, with the plane including the longitudinal axis of the cup-shaped cam 141 and the end of the cam-shaped surface 144 adjacent the base of the lobe 143. The closed end of the cup-shaped cam 141 is provided at its center with a shaft-receiving aperture 145. That aperture preferably is the same shape as and is adapted to receive the threaded end portion 75 of the shaft 67 to facilitate mounting the cup-shaped cam coaxially on that threaded end portion 75 for rotation therewith.

With the trigger 112 carrying the disk cam 134 keyed by the balls 139 on the tube 68 for rotation therewith and reciprocation axially thereof, an end of the coil spring 142 is arranged about the outer end of the threaded shaft portion 75, and that spring is moved axially therealong about the corresponding end of the tube 68 and into engagement with the disk cam 134. The cup-shaped cam 141 is now arranged with its open end adjacent to and in coaxial relationship with the outer end of the threaded shaft portion 75 and is moved axially toward the disk cam. In so moving the cup-shaped cam it may be necessary to rotate it for orienting its shaft-receiving aperture 145 with respect to the flat threaded shaft portion 75 whereby the aperture 145 will receive that shaft portion 75. When the shaft-receiving aperture is oriented to receive the shaft portion 75, continued axial movement of the cup-shaped cam in the same direction brings the outer ends of the cam lobes 143 into engagement against the end of the disk cam 134. In that position of the cup-shaped cam, the threaded shaft portion 75 extends through the shaft-receiving aperture 145 and the inner surface of the closed end of the cup-shaped cam is spaced axially from the bushing ring 79 and the encircling end of the tube 68.

Due to the angularity of the engaging surfaces 136 and 144 on the cam lobes of the disk and cup-shaped cams and the relative positions at which the disk and cup-shaped cams 134 and 141 are fixed to rotate with the shaft portion 75 and the corresponding end of the tube 68, respectively, the cam lobes 143 are slightly out of longitudinal alignment with the respective spaces between succeeding cam lobes 135 of the disk cam. Now the cup-shaped cam and the threaded shaft portion 75 are rotated relative to the disk cam 134, the resilient shaft 67 yielding torsionally to permit the relative rotation, sufficiently to align the outer end of each cam lobe 143 with the space between each two succeeding cam lobes 135.

The cup-shaped and disk cams are held in the relatively rotated positions just described while the cup-shaped cam 141 is moved axially toward the disk cam 134 until the inner surface of the closed end of the cup-shaped cam engages against the shoulder 77′ at the inner end of each flat portion 77 of the shaft 67, in axially spaced relationship with the adjacent end of the tube 68. In that position, each cam lobe 143 of the cup-shaped cam extends through the space between succeeding cam lobes 135 of the disk cam and conversely each cam lobe 135 extends outwardly between succeeding cam lobes 143 of the cup-shaped cam.

A cam retaining nut 146 (Fig. 5) screwed on the threaded shaft portion 75 and bearing against the outer surface of the closed end of the cup-shaped cam holds that cam on the shaft portion 75 against each shoulder 77′ to prevent movement of the cup-shaped cam axially of the shaft 67. The complementary shapes of the flat threaded shaft portion 75 and the shaft receiving aperture 145 prevent relative rotation between that shaft portion and the cup-shaped cam 141, and assure rotation thereof with the shaft portion 75. The drive coupling member 35 screwed on the threaded shaft portion 75 against the nut 146 locks it on for rotation with the shaft 67.

After the cup-shaped cam has been moved axially to that position, the torsionally distorted shaft 67 is permitted to return under the force of its resilience to its undistorted condition. In doing so, the shaft 67 rotates the cup-shaped cam 141 relative to the disk cam 134, thus urging the outer ends of the cam-shaped engaging surfaces 144 against the cam-shaped engaging surfaces 136, thereby moving the disk cam 134 axially inwardly of the open end of the cup-shaped cam. When so assembled the disk cam is movable axially in the cup-shaped cam in one direction against the action of the coil spring 142 and in the opposite direction until the cam-shaped engaging surfaces 136 of the disk cam engage the cam-shaped engaging surfaces 144 of the cup-shaped cam. Thus the cup-shaped cam limits axial movement of the disk cam, and hence the trigger 112 attached thereto, in one direction.

When the drive head H is in its declutched position relative to the clutch member 83 (Fig. 7), the coil spring 142 is compressed between the disk cam 134 and the closed end of the cup-shaped cam, and the cam lobes of the disk cam are adjacent the base ends of the cam lobes of the cup-shaped cam. In that position of the disk cam, if the shaft 67 is not torsionally distorted, the respective cam engaging surfaces 136 and 144 of the disk and cup-shaped cams are circumferentially spaced apart, and the flange 128 of the trigger 112 is yieldably urged against the cam surfaces 108 of the latch members 101. The latch members 101 are thereby urged radially outwardly with their arcuate flanges 106 engaging the cam surface 96 of the drive head releasably to hold it in its declutched position.

When the drive head H is moved to its clutched position relative to the clutch member 83 (Fig. 3), the coil spring 142 axially moves the disk cam 134 outwardly toward the open end of the cup-shaped cam until such movement is stopped by engagement between the cam lobes of the disk cam and the outer ends of the cam lobes of the cup-shaped cam (Fig. 2). The trigger 112 moving with the disk cam during such movement thereof moves the flange 128 into engagement with and between the flanged ends of the latch members 101 and the tube 68. In that position of the trigger 112, its flange 128 is in lapping relationship with and radially inwardly of the flanged ends of the latch members 101.

Axial movement of the disk cam 134 and trigger 112 against the action of the spring 142 is effected by the engaged cam surfaces 136 and 144 of the disk and cup-shaped cams whenever relative rotation occurs between those cams in a direction to increase the pressure between those cam surfaces. Since the cup-shaped cam, as already mentioned, rotates with the input end of the shaft 67 and the disk cam, through its attachment to the trigger 112, the ball connection of the latter to the tube 68, and the threaded connection of the tube 68 to the output end of the shaft 67, rotates with the end of the tube 68 secured to the output end of the shaft 67 and hence with the output end of the shaft 67, such relative rotation of the disk and cup-shaped cams and the consequent axial movement of the disk cam occur whenever relative rotation occurs between the input and output ends of the shaft 67 or the respectively corresponding ends of the tube 68. The relative rotation between the ends of that shaft or the ends of that tube is possible if either or both of those parts of the driving means F is torsionally yieldable as torque is applied to the input end of the driving means and is delivered to a resistance connected to the output end thereof. As already mentioned, it is preferable to make the shaft 67 torsionally yieldable.

The extent of lapping relationship between the flange 128 and the latch members 101 when the drive head H is in its clutched or driving position relative to the clutch member 83 (Figs. 2 and 6) determines the amount of axial movement of the trigger 112 against the action of the spring 142 required to release the latch members 101 for permitting declutching movement of the drive head H. The extent of that lapping relationship is adjustable by adjusting the length of the trigger 112, as already described. Since the amount of axial movement of the trigger 112 required for the flange 128 thereof thus to release the drive head H for declutching movement is determined by the amount of relative rotation between the disk and cup-shaped cams 134 and 141, or, as just explained, between the input and output ends of the torsionally yieldable shaft 67, and such relative rotation is proportional to the torque delivered by the novel torque applier, adjusting the length of the trigger 112 varies the torque at which the drive head H will be declutched from the clutch member 83.

The casing 46 is provided with suitable oil seals 147 and 148 in its opposite ends about the drive coupling member 35 (Fig. 5) and the chuck portion 53 (Fig. 4), and a usual lubricating oil is introduced into the casing to the extent that the casing is about two-thirds full, as indicated by the broken lines 148′ in Fig. 4. That oil is introduced through an opening 149 in the wall of the casing and that opening is closed and sealed by a removable, threaded plug 151. The opening 149 is preferably made in the casing sufficiently near the interengaged tabs 123 and key 131 to provide ready access thereto for adjusting the length of the trigger 112 as previously described.

In addition to its lubricating function, the oil in the casing provides a shock-absorbing effect and softens or cushions the impacts between each of the axially reciprocable members of the clutch means G in the clutch casing 61 and the movement limiting means for limiting the movement of each such member in both directions. Likewise, the oil softens or cushions the impact between the engaging surfaces of the engageable clutch teeth in the clutch means G when, after movement of the respective clutch members axially to engageable position, the driving clutch teeth are rotated into engagement with the teeth to be driven thereby.

A ball type pressure relief valve 152 is, as shown in Fig. 5, mounted in the peripheral wall of the cam retaining nut 146 and is provided with a spring urged ball 153 for opening and closing a valve port 154. That valve port 154 communicates with the inside of the casing 46 through a passage 154′, and with serially communicating passages and chambers communicating with the outside of the casing. Those passages and chambers, proceeding from the port 154, include a passage 155, a chamber 156, an annular chamber 157 formed by the groove 76 in the shaft 67 and the nut 146, a passage 158 formed by the flat portion 77 of the shaft 67 and the encircling coupling member 35, an annular chamber 159 in the passage 38 about the flange 43, and a passage 161.

In the use of the novel torque applier, because of the frequent and rapid operation of the clutch means G in the oil in the clutch casing 61, there is a tendency to build up air pressure within the casing 46. The above-described valve and communicating passages and chambers constitute means for automatically relieving such air pressure without permitting the oil to escape from the casing. During operation, the nut 146 and hence the valve 152 rotate with the shaft 67 and the resulting centrifugal action keeps the spring urged ball 153 off its seat or away from the port 154. Thus air may pass from inside the casing 46 through that port, the passage 155, the chamber 156, the annular chamber 157, the passage 158, the chamber 159, and the passage 161 to outside the casing 46, whereby to relieve the undesirable air pressure within the casing.

When the shaft 67 and the nut 146 cease to rotate, the ball 166 is automatically reseated by its spring to close and seal the port 154. While the valve 152 serves thus automatically to equalize the inside air pressure of the casing with the outside air pressure and to maintain equality of those air pressures during operation of the torque applier, the oil nevertheless will not escape from the casing either when the shaft 67 is rotating or when it has ceased to rotate. The oil cannot escape when the shaft is not rotating because the valve, as already stated, is held closed by the spring urging the ball 153 to its valve closed position relative to the valve port 154. The oil cannot escape when the shaft is rotating because the nut 146 carrying the valve rotates with the shaft and hence any of the oil approaching or entering the valve port 154 will be prevented by centrifugal action from flowing therethrough and out of the casing.

As previously mentioned, the novel power driven torque applier is useful for among other purposes applying torque to bolts, nuts, screws, studs or other work, and automatically disrupting or interrupting the transmission of torque at variable predetermined values or amounts thereof. For setting, for example, bolts or nuts, the work engaging means C is a usual socket-wrench member. In preparing for operation, such a socket-wrench member or other suitable work engaging means is releasably secured in the chuck portion 53 of the work head E (Fig. 1).

With the work engaging means so secured to rotate with the chuck portion 53 and with the adjustable latch operating means K set to release the latch means J at a desired torque, electrical energy is applied to the power source A as by closing the switch 39 to the electric motor to start it. The operating motor through the speed reduction gearing and the drive coupling members 34 and 35 rotates the driving means F including the shaft 67 and the tube 68 secured thereto at the end of the tube opposite its bushing ring 79. At this stage of the operation the drive head H, as shown in Figs. 2 to 4, is releasably latched by the latch means J in clutched or driving relationship with the clutch member 83. Hence the drive head H, keyed by the balls 99 to the driving means F, rotates therewith and drives the clutch member 83.

The work head E is not, however, rotating because it is yieldably held by the spring 65 in the outer position with the external flange 56 engaging the casing shoulder 57. In that position of the work head (see Figs. 2 to 4), the outer end of the chuck portion 53 extends outwardly beyond the output end of the casing 46; the chuck teeth 59 are axially separated from the clutch teeth 85; and the internal flange 62 of the clutch casing 61 is adjacent the side of the external flange 91 of the drive head H opposite the clutch teeth 92.

A user now applies the work engaging means in the chuck portion 53 to the work and moves the torque applier toward the work with the small force necessary to cause the coil spring 65 to yield axially. As that is done, the work head E is moved axially to its inner position (Fig. 6) against the action of the spring 65. The work head remains in that inner position so long as the work engaging means is held against the work. In that inner position of the work head, as shown in Fig. 6, the outer end of the chuck portion 53 is about flush with the outer end of the casing portion 48; the flange 56 and the shoulder 57 are axially spaced apart; the clutch teeth 59 and 85 are in mesh or drive transmitting engagement; and the internal flange 62 of the clutch casing 61 is spaced axially from the external flange 91 of the drive head H. Due to the engagement between the clutch teeth 59 and 85 when the work head is moved to its inner position while the drive head H and the clutch member 83 are rotating together, the work head E and the work engaging means C are rotated to apply torque to the work.

As the torque is applied to the work, due to its resistance or the counter-torque thereof, the shaft 67 yields torsionally to a degree determined by the resilience of the shaft and, as the applied torque and resistance thereto of the work increase, the degree of yielding of the shaft 67 increases. Such torsional yielding of the shaft results in relative rotation of its opposite ends to a degree varying as the applied torque and the resistance thereto of the work. The cup-shaped cam 141 secured to the shaft near its threaded end portion 75 rotates with that end of the shaft. The tube 68, on the other hand, rotates with the opposite end of the shaft 67 since they are connected together by their threaded end portions 78 and 73, respectively. Therefore, the relative rotation of the opposite ends of the shaft 67 causes relative rotation of the cup-shaped cam 141 and the adjacent end of the tube 68. Since the disk cam 134, through its connection to the trigger 112 and the connection thereof by the balls 139 to the tube 68, rotates with that tube, such relative movement of the opposite ends of the shaft results in relative rotation of the engaged disk and cup-shaped cams 134 and 141 to a degree varying as the applied torque and the resistance thereto of the work.

Thus the disk and cup-shaped cams 134 and 141, the trigger 112, and the balls 139 constitute a connection between the input end of the shaft 67 and the corresponding end of the tube 68. That connection permits relative rotation between that end of the shaft and the tube. The disk and cup-shaped cams 134 and 141 translate the torque producing that relative rotation into a force acting axially of the driving means F and hence causing axial movement of the disk cam 134 toward, and relative to, the cup-shaped cam. Consequently, as torque is applied to the work, the disk cam moves inwardly of the cup-shaped cam against the action of the coil spring 142.

In so moving, the disk cam carries with it the trigger 112, thus moving the external flange 128 at the opposite end of the trigger 112 outwardly of its engagement between the swingable ends of the latch members 101 and the tube 68. The extent of such axial movement of the disk cam, trigger, and flange 128 varies as the degree of relative rotation of the disk and cup-shaped cams and hence of the relative rotation of the opposite ends of the shaft 67, or in other words, as the amount of applied torque and the resistance thereto of the work.

When, therefore, the torque being applied to the work increases to the amount equal to that for which the adjustable trigger 112 is set to release the latch means J, the just-described axial movement of the trigger 112 will be sufficient to move the trailing end of its flange 128 outwardly from engagement between the latch members 101 and the tube 68 to a position slightly beyond the adjacent sides of the cam-shaped surfaces 108 at the swingable ends of the latch members 101. At this stage of the operation, only the mass of the drive head H and the small force of the coil spring 142 acting through the trigger 112, the engaged flange 128 thereof and the cam surfaces 108 of the swingable latch members 101, and the engaged cam surfaces 107 and 97 of the swingable latch members and drive head H, respectively, resist axial movement of the drive head toward its declutched position to disrupt or to interrupt the delivery of torque to the work. Even that small force of the spring is not directly resisting such axial movement of the drive head and the effective portion of that small force is such as to be substantially negligible. For practical purposes, therefore, it may be said that the resistance to such movement of the drive head H is substantially its inertia or the resistance of its mass to movement, and the amount of force necessary to produce such movement of the drive head H is substantially only that required just to overcome such a relatively small resistance.

That force is applied by the cam action of the cam-shaped engaging surfaces 88 and 93 of the clutch teeth 86 and 92 and is being exerted at the instant the trigger 112 is moved, as just described, to release the drive head, or in other words, when the amount of torque equals the amount for which the adjustable trigger 112 is set to release the latch means J.

Thus when the applied torque reaches that amount and the drive head H is released, the cam-shaped surfaces 88 and 93 of those clutch teeth 86 and 92 immediately cam the drive head axially toward the input end of the driving means F until the end of the external flange 91 opposite the clutch teeth 92 engages and is stopped by the internal flange 62 of the clutch casing 61 (Fig. 7).

In that position, the drive head H is declutched from the clutch member 83 which together with the work head E and the work engaging means C ceases to rotate. When the drive head is so declutched, the distorting torque which had caused the shaft 67 to yield torsionally is relieved, and the shaft returns to its undistorted condition under the force of its own resilience, thus relieving the torque exerted between the cam-shaped engaging surfaces 136 and 144 of the disk and cup-shaped cams 134 and 141 to facilitate the subsequent movement of the disk cam axially toward the open end of the cup-shaped cam by the coil spring 142.

During movement of the drive head H to that declutched position, the cam surfaces 97 and 107 of the latch means J cooperate to swing the swingable ends of the latch members 101 radially inwardly sufficient to permit the internal flange 95 of the drive head to move beyond the swingable ends of the latch members. Such movement of the latch members 101 causes the cam surfaces 108 thereof to move the trigger 112 slightly axially against the action of the coil spring 142. When the drive head flange 95 during the declutching movement of the drive head clears the swingable ends of the latch members 101, the coil spring 142 moves the trigger 112 in its opposite direction to cause its end flange 128 in cooperation with the cam surfaces 108 to swing the latch members 101 radially outwardly until their arcuate flanges 106 enter the annular slot 94 in the drive head. In that position of the latch members, their arcuate flanges 106 engage the cam surface 96 of the drive head and are yieldably held in that position by engagement of the flange 128 with the cam surface 108, whereby releasably to hold the drive head H in its declutched position.

With the parts in the position just described, the work head E and the work engaging means C remain stationary, and the work head remains at its inner position so long as it is held against the work with sufficient force to prevent the spring 65 from moving it toward the outer position. The driving means F and drive head H, however, continue to be rotated by the power source A. One bolt or nut now having been set at the predetermined torque, the user moves the torque applier away from the work whereby to withdraw the work engaging means C therefrom.

As that occurs, the coil spring 65 moves the work head E axially toward its outer position. In so moving, the work head E, by reason of the engagement between the internal flange 62 of the clutch casing 61 and the external flange 91 of the drive head H, moves the drive head toward its clutched position with the clutch member 83. Such movement of the drive head causes its cam surface 96 engaging the arcuate flanges 106 of the latch members 101 to swing the latch members radially inwardly sufficiently to permit passage of the flange 95 of the drive head by and beyond the arcuate flanges 106. The coil spring 142 yields under the force resulting from the cam action between the cam surfaces 108 and the trigger flange 128 as the latch members are so swung radially inwardly. After the drive-head flange 95 moves beyond the arcuate flanges 106, as just described, the coil spring 142 moves the trigger 112 and attached disk cam 134 to their initial positions. When the trigger is so moved, the cam action between its flange 128 and the cam surfaces 108 swings the latch members 101 radially outwardly to their positions latching the drive head in its clutched position relative to the clutch member 83, and the flange 128 returns to its engagement between the tube 68 and the flanged ends of the latch members 101 whereby releasably to hold the latch members in their latching relationship with the drive head.

While the drive head is being so moved toward its clutched position relative to the clutch member 83 by the work head E, the moving work head E is being moved by the spring 65 out of clutched relationship or meshing engagement with that clutch member 83. The arrangement, as will be understood from the description of the clutch means G, is such that during such movement of the work head and drive head, the clutch teeth 59 of the former disengage the clutch teeth 85 of the clutch member 83 just before the leading or outer ends of the clutch teeth 92 of the drive head reach the plane of the outer ends of the clutch teeth 86 of the clutch member 83.

During continued axial movement of the rotating drive head H toward its clutched position, either the rotating clutch teeth 92 move into meshing engagement with the clutch teeth 86 and the work head moves on to its outer position, which are the initial positions of the drive and work heads, or the leading ends of the rotating clutch teeth 92 engage against the outer ends of the stationary clutch teeth 86 and interrupt the return of the drive and work heads to their initial positions. When return of the drive and work heads to their initial positions is so interrupted, the resulting frictional engagement between the ends of the clutch teeth 92 and 86 causes the rotating drive head to impart rotation to the clutch member 83.

During such rotation of the clutch member 83, the portion of the spring-urged ball 87 extending beyond the outer end of one of the teeth 85 of the rotating clutch member 83 engages the opposed end or ends of one or more of the clutch teeth 59 on the now stationary work head E and thus retard the rotative speed of the clutch member 83. When that occurs, the ends of the clutch teeth 92 of the drive head H rotating at unretarded speed rotate relative to the ends of the clutch teeth 86 of the clutch member 83 and thus out of engagement until the clutch teeth 92 register with the spaces separating the clutch teeth 86 from one another. As soon as the clutch teeth 92 are in registration with such spaces between succeeding clutch teeth 86, the spring 65 resumes the axial movement of the drive and work heads and moves them to their initial positions (Fig. 4).

The foregoing is a description of one cycle of operation of the novel torque applier. If desired, the trigger 112 is now adjusted by increasing or decreasing its length, as described above, to set the torque applier for automatic disruption or interruption of its drive at a greater or lesser predetermined torque. Whether or not the trigger is so adjusted, the tool may be applied to other nuts, bolts, or devices requiring torque, one at a time, in the manner described above, to repeat the foregoing cycle for each such device.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a torque applier, a rotatable spindle torsionally yieldable in response to resistance to rotation encountered thereby, a tube surrounding said spindle and rigidly connected thereto at one end, a connection at the other end of said tube with said spindle, permitting relative movement between the spindle and said other end of the tube during torsional yielding of said rotatable spindle, a clutch element mounted on said tube for rotation therewith and axial movement relative thereto, means releasably holding said clutch element against axial movement, and means operated by said connection for releasing the holding means upon relative movement between said spindle and said other end of the tube.

2. A torque applier comprising a rotatable driving member, a clutch element mounted on said member for rotation relative thereto, an axially movable clutch element mounted on said member for rotation therewith at one end of the first said clutch element and movable therealong in one direction to establish driving connection between said clutch elements and movable in the opposite direction to separate them, an axially movable work head arranged at the opposite end of the first said clutch element and adapted to be driven by said driving member through said clutch elements, and means carried by said work head for limiting axial movement of said axially movable clutch element in the direction to separate said clutch elements.

3. A torque applier comprising a driving member, a work head mounted for sliding movement and drivable by said driving member, coaxial clutch elements for transmitting rotary force to said work head from said driving member, one of said clutch elements being more remote than another of said clutch elements from said work head and being axially reciprocable to separate and to engage said clutch elements, means carried by said work head for limiting axial movement of the axially reciprocable clutch element in a direction to separate said clutch elements, and means cooperating with the limiting means for axially moving said axially reciprocable clutch element in a direction to engage said clutch elements.

4. A torque applier comprising a casing containing a quantity of lubricating oil, rotatable, axially movable torque transmission elements submerged in the oil in said casing, conduit means providing communication between the inside and outside of said casing, a pressure relief valve mounted in said casing to control communication between the inside and outside thereof through said conduit means and rotatable with said torque transmission elements, means for opening said valve when said torque applier is in operation to permit the escape of air from said casing, and means for automatically closing said valve when said torque applier is at rest to prevent the escape of oil from said casing.

5. In a torque applier, rotatable, coaxial driving, driven, and intermediate clutch members, said driving and driven clutch members being axially reciprocable to and from clutched relationship with the intermediate clutch member, means for moving the driving clutch member from clutched relationship with said intermediate clutch member, means for moving the driven clutch member to clutched relationship with said intermediate clutch member, and means for together moving said driving clutch member to and said driven clutch member from clutched relationship with said intermediate clutch member.

6. In a torque applier, rotatable, coaxial driving, driven, and intermediate clutch members, said driving and driven clutch members being axially reciprocable to and from clutched relationship with the intermediate clutch member, means for moving the driving clutch member from clutched relationship with said intermediate clutch member, and means for moving the driven clutch member to clutched relationship with said intermediate clutch member, and means on said driven clutch member and movable therewith when it is moved to clutched relationship with said intermediate clutch member for limiting the movement of said driving clutch member in a direction away from clutched relationship with said intermediate clutch member.

7. In a torque applier, rotatable, coaxial driving, driven, and intermediate clutch members having opposed clutch teeth adapted to mesh for establishing driving connection between said driving and driven clutch members through the intermediate clutch member, means for releasably holding the driven clutch member in a position at which its teeth mesh with the teeth of said intermediate clutch member, means for releasably holding the driving clutch member axially spaced from said intermediate clutch member with the opposed ends of their teeth spaced apart a distance greater than the axial length of the teeth of said driven clutch member, means for together moving said driving clutch member axially toward and said driven clutch member axially away from clutched relationship with said intermediate clutch member, and means, carried by said intermediate clutch member and engageable with a tooth of said driven clutch member when, during axial movement of said driving clutch member toward and of said driven clutch member away from said intermediate clutch member by the last said means, the opposed ends of the teeth of said driving and intermediate clutch members engage against each other and the opposed ends of the teeth of said intermediate and driven clutch members are spaced apart axially thereof, for retarding rotation of said intermediate clutch member relative to that of said driving clutch member whereby the teeth of the latter move out of end engagement with the teeth of said intermediate clutch member.

8. A torque applier comprising a work head, driving means therefor including a rotating torsionally yieldable, torque transmitting member providing relative movement between spaced portions thereof, clutch means for establishing and disrupting driving relationship between said driving means and said work head, releasable latch means for releasably holding said clutch means in clutched position drivingly relating said driving means and said work head, declutching means for declutching said clutch means upon release of said latch means, operating means having a connection with said torque transmitting member adapting said operating means to rotate with and to move axially of said torque transmitting member for releasing said latch means, and actuating means engageable with said operating means and having a connection with said torque transmitting member axially spaced from the first said connection, adapting said actuating means to rotate with said torque transmitting member for operating said operating means upon torsional yielding of said torque transmitting member at a predetermined torque to release said latch means.

9. A torque applier according to claim 8 wherein said operating means cooperates with said releasable latch means releasably to hold said clutch means declutched upon release thereof by said latch means and operation of said clutch means by said declutching means.

10. A torque applier as set forth in claim 8 wherein said operating means is adjustable to vary the predetermined torque at which said latch means is released.

11. In a torque applier, a rotatable spindle, a clutch member mounted on and rotatable about said spindle, an axially reciprocable clutch member mounted on and radially spaced from said spindle for rotation therewith and movable axially thereof to clutched relationship with the first said clutch member, a releasable latch member having one end hinged to said spindle and having its other end radially between said spindle and said axially reciprocable clutch member and releasably engaging said axially reciprocable clutch member to hold it in clutched relationship with the first said clutch member, said other end of said latch member being swingable about the hinged end thereof radially of said spindle to and from latching engagement with said axially reciprocable clutch member when said latch member is released, means for releasing said latch member while said axially reciprocable clutch member is in clutched relationship with the first said clutch member, and means on said axially reciprocable clutch member for swinging the released latch member radially inwardly toward said spindle out of latching engagement with said axially reciprocable clutch member as it moves from clutched relationship with the first said clutch member.

12. In a torque applier, a rotatable spindle, a clutch member mounted on and rotatable about said spindle, an axially reciprocable clutch member mounted on and radially spaced from said spindle for rotation therewith and movable axially thereof to declutched relationship with the first said clutch member, a releasable latch member having one end hinged to said spindle and having its other end radially between said spindle and said axially reciprocable clutch member and releasably engaging said axially reciprocable clutch member to hold it in declutched relationship with the first said clutch member, said other end of said latch member being swingable about the hinged end thereof radially of said spindle to and from latching engagement with said axially reciprocable clutch member when said latch member is released, means for releasing said latch member while said axially reciprocable clutch member is in declutched relationship with the first said clutch member, and means on said axial reciprocable clutch member for swinging the released latch member radially inwardly toward said spindle out of latching engagement with said axially reciprocable clutch member as it moves from declutched relationship with the first said clutch member.

13. A torque applier comprising a casing containing a quantity of lubricating oil, rotatable, axially movable torque transmission elements submerged in the oil in said casing, conduit means communicating between the inside and outside of said casing, a pressure relief valve mounted in said casing and controlling communication through said conduit means between the inside and outside of said casing, means for automatically operating said pressure relief valve to open it to permit the escape of air from said casing during operation of said torque applier, and means for automatically operating said pressure relief valve to close said valve to prevent escape of oil from said casing while the torque applier is at rest.

14. A torque applier comprising rotatable, driving means, driven means, a clutch member, clutch elements on said driving and driven means at opposite sides of said clutch member and movable axially into clutched engagement with said clutch member to establish a disruptible driving connection between said driving and driven means, declutching means for axially separating one of said clutch elements from said clutch member to disrupt said driving connection between said driving and driven means, and torque responsive means connected to said driving means and including a member movable axially thereof as the applied torque increases to actuate said declutching means when the applied torque reaches a predetermined amount.

15. A torque applier comprising driving means including a rotatable torque responsive member torsionally yieldable in response to the torque applied by said driving means, a member adapted to be driven by said driving means, a clutch member, a clutch element on said driving means at one side of said clutch member, a clutch element on the member driven by said driving means and at the other side of said clutch member, said clutch elements being axially movable into clutched engagement with said clutch member to establish a disruptible driving connection between said driving means and the driven member, declutching means for operating one of said clutch elements to disrupt said driving connection, and actuating means including a member movable axially of said driving means as the applied torque increases to actuate said declutching means when the applied torque reaches a predetermined amount.

16. A torque applier comprising drivable means, drive means, clutch elements adapted to transmit and to interrupt the transmission of torque from said drive means to said drivable means for driving the same, means mounting one of said clutch elements for movement from each to the other of a position of driving engagement with another of said clutch elements and another position spaced therefrom, clutch holding means for releasably holding the movable clutch element in its first said position, and declutching means urging said movable clutch element during driving of said drivable means by said drive means from the first said position toward said other position and, upon release of said movable clutch element, applying a force to said movable clutch element for only an initial portion of the distance between said positions for throwing said movable clutch element, when released, the entire distance from the first said position to said other position beyond said initial portion of the distance between said positions.

17. A torque applier as set forth in claim 16 wherein said declutching means derives said force from said drive means.

18. A torque applier as set forth in claim 16 wherein said force is proportional to and varies with the torque transmitted by said drive means.

19. A torque applier as set forth in claim 16 wherein said declutching means derives said force from said drive means and said force varies with and is proportional to the resistance encountered by said drivable means when driven by said drive means.

20. A torque applier as set forth in claim 16 wherein said declutching means derives said force from said drive means and said force varies with and is proportional to the resistance encountered by said drivable means when driven by said drive means, and comprising means for automatically operating said clutch holding means to release said movable clutch element at a predetermined value of said resistance.

21. A torque applier comprising a rotatable member, a drive shaft therefor, clutch means including a drivable clutch element and a drive clutch element for drivingly connecting said drive shaft and said rotatable member, means for releasably holding said drive clutch element in a clutched position of driving engagement with said drivable clutch element, means mounting said drive clutch element for movement, upon release thereof, from its clutched position to a declutched position out of driving engagement with and spaced from said drivable clutch element, and means for applying to said drive clutch element, upon release thereof, a sufficient force only for an initial portion of the distance between the clutched and declutched positions of said drive clutch element to throw it from said clutched position to said declutched position beyond said initial portion of the distance between said positions.

22. A torque applier as set forth in claim 21 wherein the force applying means is adapted to derive said force from said drive shaft.

23. A torque applier as set forth in claim 21 wherein said movement of said drive clutch element is axially of and relative to said drive shaft.

24. A torque applier as set forth in claim 21 wherein said movement of said drive clutch element, upon release thereof, is resisted substantially only by the inertia thereof, and said force is sufficient to overcome said inertia and to impart enough momentum to said drive clutch element whereby said movement thereof is continued after the application of said force ceases.

25. A torque applier as set forth in claim 21 comprising means for releasably holding said drive clutch element in said declutched position.

26. A torque applier as set forth in claim 21 comprising torque responsive means for operating the holding means to release said drive clutch element at a predetermined value of the torque transmitted by said clutch means from said drive shaft to said rotatable member.

27. A torque applier as set forth in claim 21 comprising adjustable torque responsive means for operating the holding means to release said drive clutch element at any of a plurality of values of the torque transmitted by said clutch means from said drive shaft to said rotatable member.

28. In a torque applier, a rotatable spindle, a driving clutch element, means mounting said clutch element on said spindle for rotation therewith and axial movement therealong into and out of driving position, holding means movable to engage said clutch element, movable means for forcing the holding means into engagement with said clutch element releasably to hold it in driving position, torque responsive means for withdrawing the forcing means to free said clutch element for movement out of driving position, and means for applying to said clutch element, upon withdrawal of said forcing means, a sufficient force for only an initial portion of the distance said clutch element is to be moved to throw it out of its driving position to a position beyond said initial portion of the distance that said clutch element is to be moved.

29. In a torque applier as set forth in claim 28 wherein said holding means comprises latch means movable transversely of the axis of said spindle to and from engagement with said clutch element, and the movable forcing means is movable axially along said spindle to force said latch means into engagement with said clutch element for holding it in driving position, and is movable in the opposite direction to free said latch means for movement out of engagement with said clutch element.

30. In a torque applier as set forth in claim 28 wherein the movable forcing means is reciprocable axially along said spindle and when moved in one direction forces said holding means into engagement with said clutch element to hold it in driving position and when moved in the opposite direction frees said holding means for movement out of engagement with said clutch element and is engageable with said clutch element to hold it out of driving position.

31. A torque applier comprising driving and driven means, clutch elements releasably held in driving engagement and drivingly connecting said driving and driven means, means mounting one of said clutch elements for axial movement, upon release thereof, relative to the driving means from its position of driving engagement with another of said clutch elements to a position out of driving engagement with and spaced from said other of said clutch elements whereby said movement is resisted substantially only by the inertia of the axially movable clutch element, and means for applying to said axially movable clutch element, upon release thereof, a sufficient force, only for an initial portion of the distance between the aforesaid positions, to overcome said inertia and to throw said axially movable clutch element the entire distance between said positions.

32. A torque applier comprising driving and driven means, clutch elements releasably held in driving engagement and drivingly connecting said driving and driven means, means mounting one of said clutch elements for movement, upon release thereof, from its position of driving engagement with another of said clutch elements to a position out of driving engagement with and spaced from said other of said clutch elements whereby said movement is resisted substantially only by the inertia of the said one of said clutch elements, and means for applying to the said one of said clutch elements, upon release thereof, a sufficient force only for an initial portion of the distance between the aforesaid positions, to overcome said inertia and to throw the said one of said clutch elements the entire distance between said positions.

33. A torque applier comprising driving and driven means, clutch elements releasably held in driving engagement and drivingly connecting said driving and driven means, means mounting one of said clutch elements for movement, upon release thereof, from its position of driving engagement with another of said clutch elements to a position spaced therefrom, and means for applying to the said one of said clutch elements, upon release thereof, a sufficient force only for an initial portion of the distance between the aforesaid positions to project the said one of said clutch elements from the first said position to its position spaced from said other of said clutch elements beyond said initial portion of the distance between said positions.

34. A torque applier comprising driving and driven means, clutch elements one of which is releasably held in a position of driving engagement with another of said clutch elements and, upon release, is movable from said position of driving engagement with said other of said clutch elements to a position spaced therefrom, and means for applying to the movable clutch element, upon release thereof, a sufficient force only for an initial portion of the distance between the aforesaid positions to project said movable clutch element from its first said position to its other said position beyond said initial portion of the distance therebetween.

35. A torque applier as set forth in claim 34 wherein the force applying means derives said force from the driving means.

36. A torque applier as set forth in claim 34 comprising means for releasably holding said movable clutch element in its other said position.

37. A torque applier as set forth in claim 34 comprising torque responsive means for releasing said movable clutch element at a predetermined value of the torque transmitted by said clutch elements from said driving means to the driven means.

38. A torque applier as set forth in claim 34 comprising adjustable torque responsive means for releasing said movable clutch element at any of a plurality of values of the torque transmitted by said clutch elements from said driving means to the driven means.

39. A torque applier as set forth in claim 34 comprising adjustable torque responsive means for releasing said movable clutch element at any of a plurality of values of the torque transmitted by said clutch elements from said driving means to the driven means, and means for adjusting said torque responsive means to release said movable clutch element at any predetermined one of said values of torque.

40. A torque applier as set forth in claim 34 comprising means for limiting the movement of said movable clutch element from its first said position to its other said position, and a casing surrounding said clutch elements and the movement limiting means and containing oil to cushion the impact between said movable clutch element and said movement limiting means.

References Cited in the file of this patent

UNITED STATES PATENTS

| | | |
|---|---|---|
| 748,018 | Rowe | Dec. 29, 1903 |
| 1,881,728 | Levedahl | Oct. 11, 1932 |
| 1,913,046 | Callan | June 6, 1933 |
| 2,151,724 | Wengel et al. | Mar. 24, 1939 |
| 2,160,622 | Olson | May 30, 1939 |
| 2,537,422 | Ridge | Jan. 9, 1951 |
| 2,546,633 | Dodge | Mar. 27, 1951 |
| 2,642,971 | Hagenbook | June 23, 1953 |